(12) United States Patent
Zheng et al.

(10) Patent No.: US 7,630,337 B2
(45) Date of Patent: *Dec. 8, 2009

(54) METHOD AND SYSTEM FOR AN IMPROVED USER GROUP SELECTION SCHEME WITH FINITE-RATE CHANNEL STATE INFORMATION FEEDBACK FOR FDD MULTIUSER MIMO DOWNLINK TRANSMISSION

(75) Inventors: Jun Zheng, La Jolla, CA (US);
Chengjin Zhang, La Jolla, CA (US);
Pieter van Rooyen, San Diego, CA (US)

(73) Assignee: Broadcom Corporation

( * ) Notice: Subject to any disclaimer, the term of this patent is extended or adjusted under 35 U.S.C. 154(b) by 676 days.

This patent is subject to a terminal disclaimer.

(21) Appl. No.: 11/232,266

(22) Filed: Sep. 21, 2005

(65) Prior Publication Data

US 2007/0064632 A1 Mar. 22, 2007

(51) Int. Cl.
*H04Q 7/00* (2006.01)
*H04B 11/00* (2006.01)
*H04M 11/00* (2006.01)

(52) U.S. Cl. .............. 370/329; 455/67.11; 455/69; 455/513; 455/562.1; 375/267

(58) Field of Classification Search .......... 370/310–350
See application file for complete search history.

(56) References Cited

U.S. PATENT DOCUMENTS

| | | | |
|---|---|---|---|
| 6,728,307 B1 * | 4/2004 | Derryberry et al. ......... | 375/219 |
| 7,403,748 B1 * | 7/2008 | Keskitalo et al. ............ | 455/101 |
| 2004/0233871 A1 * | 11/2004 | Seki et al. .................... | 370/331 |
| 2005/0190868 A1 * | 9/2005 | Khandekar et al. .......... | 375/346 |
| 2005/0265223 A1 * | 12/2005 | Song .......................... | 370/208 |
| 2006/0203794 A1 * | 9/2006 | Sampath et al. ............. | 370/344 |

OTHER PUBLICATIONS

E. Telatar, "Capacity of multi-antenna gaussian channels," *Bell Labs Technical Journal*, Jun. 1995, pp. 1-28.
G. J. Foschini, "Layered space-time architecture for wireless communication in a fading environment when using multiple antennas," *Bell Labs Technical Journal*, vol. 1, No. 2, pp. 41-59, 1996.
S. Caire, G. Shamai, "On the achievable throughput of a multiantenna gaussian broadcast channel," *IEEE Trans. On Information Theory*, vol. 49, No. 7, pp. 1691-1706, 2003.

(Continued)

*Primary Examiner*—Seema S Rao
*Assistant Examiner*—Wanda Z Russell
(74) *Attorney, Agent, or Firm*—McAndrews, Held & Malloy, Ltd.

(57) ABSTRACT

Certain embodiments of the invention may be found in a method and system for an improved user group selection scheme with finite-rate channel state information feedback for frequency division duplex (FDD) multiuser multiple-input-multiple-output (MIMO) downlink transmission. Aspects of the method may include selecting, from a plurality of users in a FDD multiuser communication system, a first user having a channel gain that is greater than a channel gain corresponding to a remaining portion of the plurality of users. A second user may be selected from the remaining portion of the plurality of users, based on a channel gain of the second user and orthogonality of the second user's channel direction with respect to the first user. The selected second user may have a channel gain that is greater than a channel gain corresponding to the remaining portion of the plurality of users.

30 Claims, 6 Drawing Sheets

OTHER PUBLICATIONS

V. Tarokh, H. Jafarkhani, and A. R. Calderbank, "Space-time block codes from orthogonal designs," *IEEE Trans. On Information Theory*, vol. 45, pp. 1456-1467, Jul. 1999.

K. N. Lau, Y. Liu, and T. A. Chen, "On the design of MIMO block-fading channels with feedback-link capacity constraint," IEEE Trans. on Communications, vol. 52, No. 1, pp. 62-70, Jan. 2004.

D. J. Love, R. W. Heath, Jr., and T. Strohmer, "Grassmannian beamforming for multiple-input multiple-output wireless systems," *IEEE Trans. on Information Theory*, vol. 49, pp. 2735-2747, Oct. 2003.

J. C. Roh and B. D. Rao, "Design and analysis of MIMO spatial multiplexing systems with quantized feedback," *submitted to IEEE Trans. on Signal Processing*, pp. 1-30, 2005.

P. Xia and G. B. Giannakis, "Design and analysis of transmit-beamforming based on limited-rate feedback," *IEEE Trans. on Signal Processing*, pp. 1-26., 2005 (to appear).

R. Knopp and P. A. Humblet, "Information capacity and power control in single-cell multiuser communications," in *IEEE International Conference on Communications 1995*, vol. 1, Seattle, pp. 331-335, 1995.

D. Gesbert and M. S. Alouini, "How much feedback is multi-user diversity really worth?" in *IEEE International Conference on Communications 2004*, vol. 1, pp. 234-238, 2004.

S. Sanayei and A. Nosratinia, "Exploiting multiuser diversity with only 1-bit feedback," in *IEEE Wireless Communications and Networking Conference 2005*, vol. 2, Seattle, pp. 978-983, 2005.

T. Yoo and A. J. Goldsmith, "Optimality of zero-forcing beamforming with multiuser diversity," in *2005 IEEE International Conference on Communications*, Seoul, Korea, pp. 542-546, May 2005.

C. B. Peel, B. M. Hochwald, and A. L. Swindlehurst, "A vector-perturbation technique for near-capacity multiantenna nultiuser communication—Part I: channel inversion and regularization," *IEEE Trans. on Communications*, vol. 53, No. 1, pp. 195-202, Jan. 2005.

C. Windpassinger, R. F. H. Fischer, T. Vencel, and J. B. Huber, "Precoding in multiantenna and multiuser communications," *IEEE Trans. on Wireless Communications*, vol. 3, No. 4, pp. 1305-1316, 2004.

B. M. Hochwald, C. B. Peel, and A. L. Swindlehurst, "A vector-perturbation technique for near-capacity multiantenna multiuser communication—Part II: perturbation," *IEEE Trans. on Communications*, vol. 53, No. 3, pp. 537-544, Mar. 2005.

J. C. Roh and B. D. Rao, "Transmit beamforming in multiple antenna systems with finite rate deedback: A VQ-based approach," *submitted to IEEE Trans. on Information Theory*, pp. 1-29, 2004.

T. K. Y. Lo, "Maximum ratio transmission," *IEEE Trans. on Communications*, vol. 47, No. 10, pp. 1458-1461, Oct. 1999.

\* cited by examiner

METHOD AND SYSTEM FOR AN IMPROVED USER GROUP SELECTION SCHEME WITH FINITE-RATE CHANNEL STATE INFORMATION FEEDBACK FOR FDD MULTIUSER MIMO DOWNLINK TRANSMISSION

CROSS-REFERENCE TO RELATED APPLICATIONS/INCORPORATION BY REFERENCE

This application makes reference to:
U.S. patent application Ser. No. 11/232,340 filed Sep. 21, 2005;
U.S. patent application Ser. No. 11/231,501 filed Sep. 21, 2005;
U.S. patent application Ser. No. 11/231,699 filed Sep. 21, 2005;
U.S. patent application Ser. No. 11/231,586 filed Sep. 21, 2005;
U.S. patent application Ser. No. 11/232,369 filed Sep. 21, 2005;
U.S. patent application Ser. No. 11/231,701 filed Sep. 21, 2005;
U.S. patent application Ser. No. 11/231,362 filed Sep. 21, 2005;
U.S. patent application Ser. No. 11/231,557 filed Sep. 21, 2005; and
U.S. patent application Ser. No. 11/231,416 filed Sep. 21, 2005.

Each of the above stated applications is hereby incorporated herein by reference in its entirety.

FIELD OF THE INVENTION

Certain embodiments of the invention relate to processing of signals in communication systems. More specifically, certain embodiments of the invention relate to a method and system for an improved user group selection scheme with finite-rate channel state information feedback for frequency division duplex (FDD) multiuser multiple-input-multiple-output (MIMO) downlink transmission.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to raise the degrees of freedom to suppress interference generated within the signal reception process. Diversity gains improve system performance by increasing received signal-to-noise ratio and stabilizing the transmission link. On the other hand, more degrees of freedom allow multiple simultaneous transmissions by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some initial work on multiple antenna systems may be focused on systems that support single user point-to-point links. However, the use of multi-antenna techniques for a multiuser environment to improve total throughput remains a challenge.

Communication systems using multiple antennas at both the transmitter and the receiver have recently received increased attention due to their promise of providing significant capacity increase in a wireless fading environment. However, most of the initial work on multiple antenna systems was focused on systems that support single user point-to-point links. More recently, various efforts have focused on utilizing multi-antenna techniques to a multiuser environment to improve total throughput.

The performance of conventional multiple antenna systems may depend on the availability of channel state information (CSI) at the transmitter (CSIT) and at the receiver (CSIR). During design and analysis stage, most of the conventional multiple-input-multiple-output (MIMO) communication systems may utilize an assumption that CSIT is complete or that there is no CSIT information available. However, in most instances, such assumptions may be impractical as only quantized CSI may be available at the transmitter. Communication systems with multiple users, such as a CDMA-based communication system or communication systems within a wireless LAN environment, may utilize user group selection algorithms and CSI feedback to achieve array gain and transmit diversity. Furthermore, multiuser diversity of the downlink channel may also be achieved by using CSI information, which may be available at the transmitter. However, most conventional user group selection algorithms, such as the optimal brute-force user group selection algorithm, may utilize complex computations to determine the CSI and may require feedback of the entire CSI from the receiving stations to the transmitting base station. Such computation complexity and full CSI feedback may increase implementation costs and reduce processing time and overall efficiency of the communication system.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an improved user group selection scheme with finite-rate channel state information feedback for frequency division duplex (FDD) multiuser multiple-input-multiple-output (MIMO) downlink transmission, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for an improved user group selection scheme with finite-rate channel state information feedback for frequency division duplex (FDD) multiuser multiple-input-multiple-output (MIMO) downlink transmission. Aspects of the method may comprise selecting, from a plurality of users in a frequency division duplex (FDD) multiuser communication system, a first user having a channel gain that is greater than a feedback channel gain corresponding to a remaining portion of the plurality of users. A second user may be selected from the remaining portion of the plurality of users, based on a feedback channel gain of the second user and feedback orthogonality of the second signal with respect to the first signal. The selected second user may have a channel gain that is greater than a feedback channel gain corresponding to the remaining portion of the plurality of users. In this regard, an improved user group selection scheme in accordance with an embodiment of the invention may significantly reduce the computational complexity and the total amount of CSI feedback information communicated from a receiver station to a base station transmitter. As used herein, the term "user" may be interpreted to refer to a mobile device.

Figure 1A:
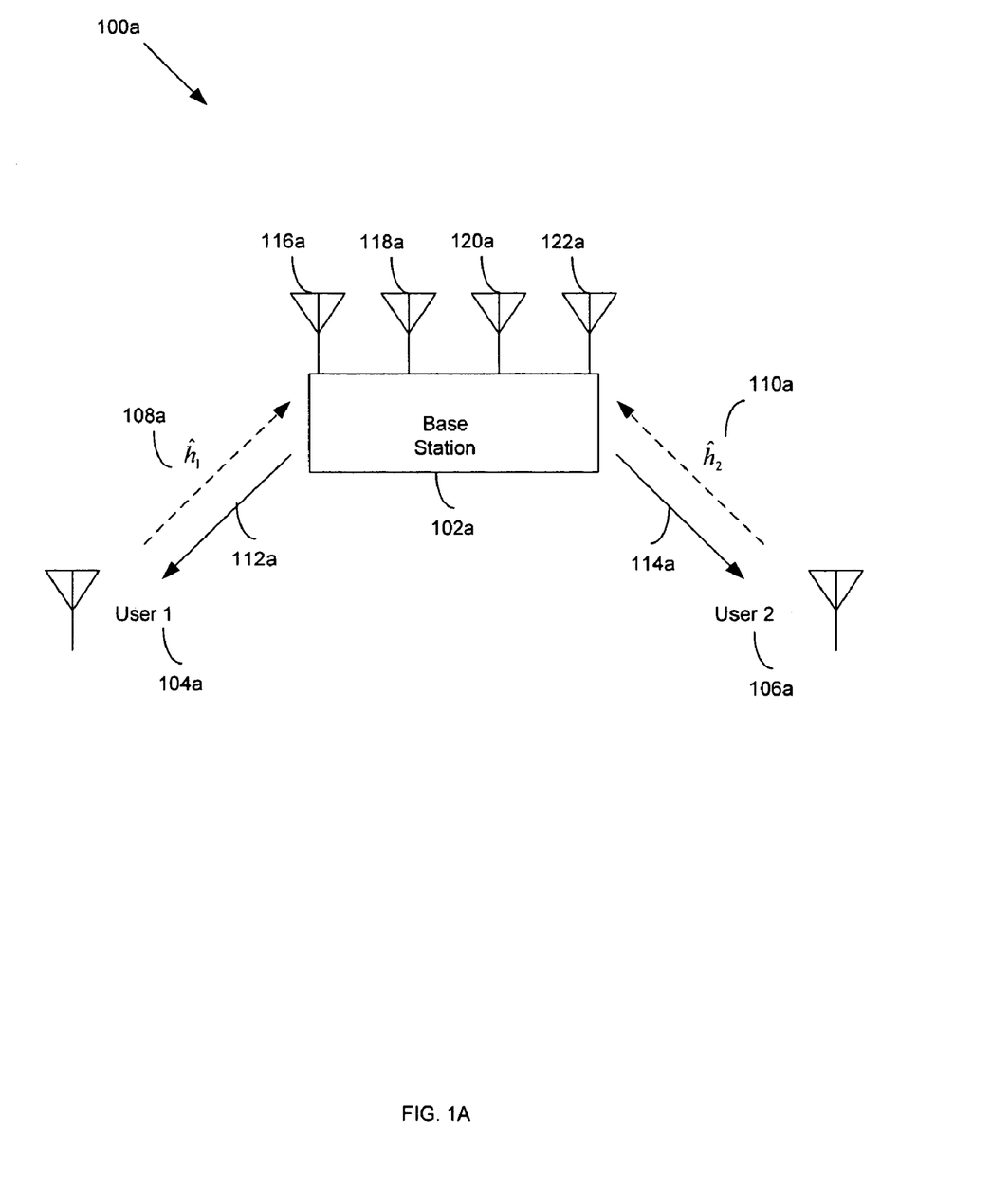
FIG. 1A is a diagram illustrating exemplary signal transmission from base station to receivers within a finite-rate feedback multiuser communication environment, in accordance with an embodiment of the invention.

FIG. 1A is a diagram illustrating an exemplary signal transmission from base station to receivers within a finite-rate feedback multiuser communication environment, in accordance with an embodiment of the invention. Referring to FIG. 1A, there is shown a communication system $100a$ comprising a base station $102a$, a first user (user 1) $104a$, and a second user (user 2) $106a$. The base station $102a$ may comprise antennas $116a, \ldots, 122a$. The first user $104a$ and the second user $106a$ may each have a single antenna. In this instance, the base station $102a$ may transmit signals $112a$ and $114a$, which are intended to be received by the first user $104a$ and by the second user $106a$, respectively.

After the first user $104a$ and the second user $106a$ process signals $112a$ and $114a$, respectively, the first user $104a$ and the second user $106a$ may communicate quantized channel state information $\hat{h}_1$ $108a$ and $\hat{h}_2$ $110a$. The quantized channel state information $\hat{h}_1$ $108a$ and $\hat{h}_2$ $110a$ may comprise channel gain information and channel direction information for the first user $104a$ and the second user $106a$, respectively. The base station $102a$ may utilize the received quantized channel state information $\hat{h}_1$ $108a$ and $\hat{h}_2$ $110a$ to precode transmit information for the first user $104a$ and the second user $106a$. In one embodiment of the invention, the first user $104a$ and the second user $106a$ may communicate limited or finite-rate channel state information $108a$ and $110a$ to the base station $102a$ via the rate constraint feedback link between the base station $102a$ and the users $104a$ and $106a$, in order to maximize throughput and increase processing speed and efficiency.

In another embodiment of the invention, the base station $102a$ may be equipped with M antennas and there may be K users within the communication system $100a$, where each user may comprise a single antenna. In such circumstances, the signal model may be expressed as $$\begin{bmatrix} y_1 \\ y_2 \\ \vdots \\ y_k \end{bmatrix} = \begin{bmatrix} h_1 \\ h_2 \\ \vdots \\ h_k \end{bmatrix} x + n, \qquad (1)$$

where $y_k$ (k=1, ..., K) may be the signal received by user k, $h_k \in \mathbb{C}^{1 \times M}$ may be the channel vector to user k, $x \in \mathbb{C}^{M \times 1}$ may be the transmitted symbol vector by the base station 102a, and n $\in \mathbb{C}^{K \times 1}$ may be the additive white Gaussian noise (AWGN) with zero mean and unit variance. The transmitted symbols may satisfy certain power constraint, for example, where $E[x^H X] \leq P$, where $(\cdot)^H$ may represent complex conjugate transpose.

In this exemplary analysis, each element in $h_k$ may be a zero-mean circularly symmetric complex Gaussian (ZMC-SCG) random variable with unit variance. Moreover, the users may experience independent fading and, therefore, the channel vectors $\{h_k\}_{k=1}^{K}$ may be statistically independent from each other. The channel state information (CSI), $h_k$, may be known to user k, but may not be known to other users. The base station 102a may have knowledge of the CSI for all users. In one embodiment of the invention, the communication system 100a may be a frequency division duplex (FDD) communication system. In this regard, the base station 102a may obtain CSI 108a and 110a from the first user 104a and the second user 106a through a rate constraint feedback link.

Employing multiple antennas at the base station in cellular multiuser communication systems may improve the downlink system capacity. This approach may be utilized with any multiuser MIMO system, such as code division multiple access 2000 (CDMA2000), wideband CDMA (WCDMA), and Wireless LAN (WLAN), for example. The capacity improvement may be attained by communicating simultaneously to multiple users through precoding at the transmitter or base station when channel state information is available. In this regard, a transmitter or base station may refer to any device or equipment which may be adapted to communicate with multiple other devices, users, and/or receivers. Moreover, a user or a receiver may refer to user equipment or device that may be adapted for communication with a base station and/or other devices. Dirty paper coding (DPC) may be utilized as a preceding scheme that may achieve the sum capacity. However, DPC may be difficult to implement due to complexity issues. There may also exist other suboptimal but relatively low complexity schemes for multiuser MIMO downlink, such as linear preceding, Tomlinson-Harashima preceding, and vector encoding, for example.

A zero-forcing (ZF) linear precoder may achieve the sum capacity when combined with infinite-order multiuser diversity, that is, when the number of users K approaches infinity. Moreover, ZF precoders may provide near-optimal performance even with a limited number of users, when K=10 for example.

The zero-forcing precoders may be a specific type of linear precoders. When the base station, for example the base station 102a in FIG. 1A, decides to transmit to a group of users $D \subseteq \{1, ..., K\}$ with $d=|D| \leq K$, a linear preceding scheme may linearly weigh the data symbols $s=[s_1, ..., s_d]^T$ before they are transmitted from the base station, $$x = FPs \quad (2)$$

where x is the transmitted signal vector as in equation (1), $F=[f_1, ..., f_d]$ may be the M×d linear precoding matrix with normalized columns ($\|f_k\|=1$), and $P=\text{diag}\{P_1, ..., P_d\}$ with $\sum_{i=1}^{d} P_i \leq P$ may be the power control matrix that may be adapted to allocate transmit power to different users. The received signal may be given by equation $$\begin{bmatrix} y_1 \\ y_2 \\ \vdots \\ y_d \end{bmatrix} = \begin{bmatrix} h_1 \\ h_2 \\ \vdots \\ h_d \end{bmatrix} FPs + n. \quad (3)$$

A zero-forcing precoder may use the pseudo-inverse of the overall channel matrix $H_D=[h_1^T, ..., h_d^T]$ as the weighting matrix when $H_D$ has full row rank, i.e.

$$W_D = H_D^\dagger = H_D^H (H_D H_D^H)^{-1}, \quad (4)$$

$$F_D = W_D \begin{bmatrix} \frac{1}{w_1} & & \\ & \ddots & \\ & & \frac{1}{w_d} \end{bmatrix}, \quad (5)$$

where $\{w_i\}_{i=1}^{d}$ are the column of $W_D$

By defining $$\xi_i \triangleq \frac{1}{w_i} \quad (6)$$

and substituting equation (5) into equation (3), the received signal for each user with zero-forcing preceding may be expressed as, $$y_i = \xi_i P_i s_i + n_i, \forall i \in D. \quad (7)$$

In this regard, the multiuser downlink channel may become a set of parallel channels. The maximum sum rate of the given user group D may be given by the equation:

$$C_D = \sum_{i \in D} \log(1 + \xi_i P_i), \quad (8)$$

where the optimal $P_i$ may be given by the water-filling solution, $$P_i = \left(\mu - \frac{1}{\xi_i}\right)^+, \quad (9)$$

with the water level µ chosen to satisfy $$\sum_{i \in D} \left(\mu - \frac{1}{\xi_i}\right)^+ = P.$$

The maximum achievable sum rate for a given channel realization may be obtained by searching over all the possible user groups, that is, $$C = \max_{D \subseteq \{1,\ldots,K\}, |D| \le M} C_D. \qquad (10)$$

An optimal or best user group selection for ZF precoding may require searching over a plurality of $\Sigma_{i=1}^{M}\binom{K}{i}$ candidate user groups to find the one with the largest sum rate, which leads to a fairly high computational cost. Moreover, in an FDD system such as the communication system 100a, the channel state information that may be needed at the transmitter 102a to perform the optimal user group search may be obtained from the users 104a and 106a through a feedback link. Because the optimal search requires CSI from each user and each user's channel is a complex vector of dimension M, that is equivalent to 2M real numbers per user, heavy burden may be placed on the feedback link to obtain this information. This may be particularly cumbersome since the feedback link tends to have very limited capacity. A user group selection scheme, such as the selection scheme described below in reference to FIG. 2B, may result in a simpler implementation and may require less feedback information. In this regard, such improved selection scheme may be utilized for finite-rate channel state information feedback within multiuser communication systems with multiple transmits antennas.

Figure 1B:
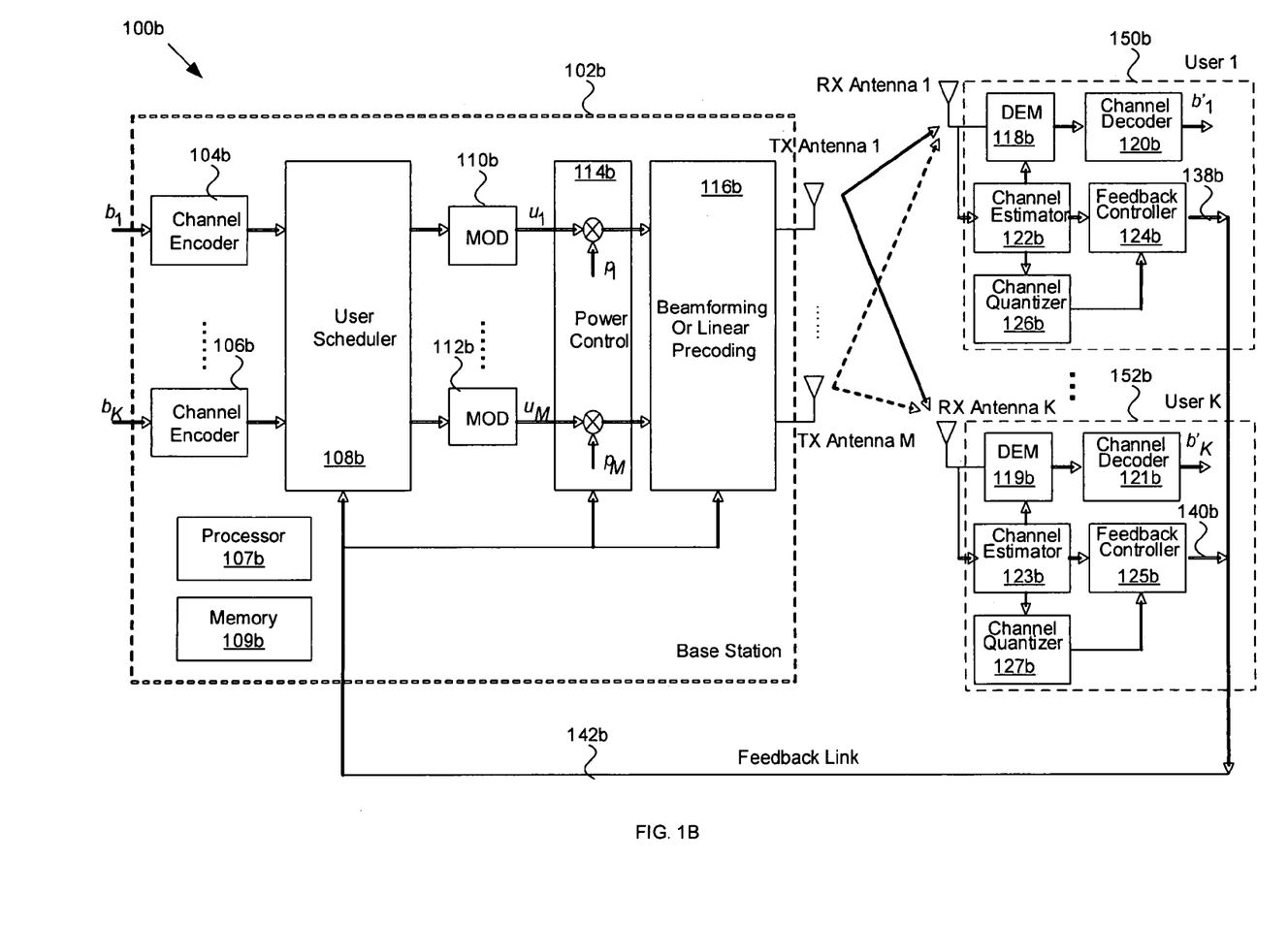
FIG. 1B is a top-level block diagram illustrating an exemplary multiuser multiple-input-multiple-output (MIMO) downlink transmission system with finite-rate channel state information feedback, in accordance with an embodiment of the invention.

FIG. 1B is a top-level block diagram illustrating an exemplary multiuser multiple-input-multiple-output (MIMO) downlink transmission system with finite-rate channel state information feedback, in accordance with an embodiment of the invention. Referring to FIG. 1B, there is shown a communication system 100b that may comprise a base station 102b and a plurality of K users 150b, . . . , 152b. Within the communication system 100b, the base station 102b may comprise M transmit (TX) antennas and each of the K users 150b, . . . , 152b may each have a single receive (RX) antenna. In this implementation, the total number of users or receiver antennas may be equal or higher than the number of base station antennas, that is, $K \ge M$.

The base station 102a may comprise a plurality of channel encoders 104b, . . . , 106b, a user scheduler 108b, a plurality of modulators (MOD) 110b, . . . , 112b, a power control block 114b, a beamforming or linear precoding block 116b, a processor 107b, and a memory 109b. Each of the plurality of users 150b, . . . , 152b may each comprise one of a plurality of demodulators (DEM) 118b, . . . , 119b, one of a plurality of channel decoders 120b, . . . , 121b, one of a plurality of channel estimators 122b, 123b, one of a plurality of channel quantizers 126b, . . . , 127b, and one of a plurality of feedback controllers 124b, . . . , 125b.

The channel encoders 104b, . . . , 106b may comprise suitable logic, circuitry, and/or code that may be adapted to encode input binary data $b_1, \ldots, b_k$ for each of the K users in the communication system 100b. The beamforming or linear precoding block 116b may comprise suitable logic, circuitry, and/or code that may be adapted to processes the user data symbols to separate signals intended for different users such that each user receives little or no interference from other users. With M antennas at the base station 102b, the beamforming or linear precoding block 116b may separate at most M different signals, that is, the base station 102b may transmit to at most M users at a time. Therefore, for each channel realization, the base station 102b may need to select M or less than M users among all the K users to transmit.

The user scheduler 108b may comprise suitable logic, circuitry, and/or code that may be adapted to locate a best user group from the plurality of users 150b, . . . , 152b that optimizes certain performance criterion such as the sum throughput of the system, for example. In this regard, the user scheduler 108b may be adapted to perform the steps of an improved user group selection algorithm, for example, to find the best user group. The user scheduler 108b may utilize knowledge of the channel state information (CSI) provided by the users 150b, . . . , 152b via the feedback path 142b when determining the best user group. The user scheduler 108b may be adapted to select a first user with the strongest channel gain and a second user with the second strongest channel gain. The user scheduler 108b may be adapted to determine a first maximum system capacity based on the first user and a second maximum system capacity based on the second user. The user scheduler 108b may also be adapted to select the highest of the first maximum system capacity and the second maximum system capacity as the maximum system capacity to be supported by the communication system 100b. In this regard, for a case when M=2, the user scheduler 108b may select the user group to comprise a pair of users associated with the maximum system capacity selected.

The modulators 110b, . . . , 112b may comprise suitable logic, circuitry, and/or code that may be adapted to modulate the binary data of each of the users selected by the user scheduler 108b. In this regard, the modulation operation on the binary data may result in a plurality of complex symbols $u_1, \ldots, u_m$, for example. The power control block 114b may comprise suitable logic, circuitry, and/or code that may be adapted to allocate different users with different power levels in accordance with their respective channel quality, for example, based on CSI received via the feedback path 142b.

The user scheduler 108b, the power control block 114b, and/or the beamforming or linear precoding block 116b may require knowledge of the state of the downlink channel. The processor 107b may comprise suitable logic, circuitry, and/or code that may be adapted to process information and/or data associated with the generation of transmission signals at the base station 102b. The processor 107b may also be adapted to control at least a portion of the operations of the base station 102b. The memory 109b may comprise suitable logic, circuitry, and/or code that may be adapted to store data and/or control information that may be utilized in the operation of at least a portion of the base station 102b.

The demodulators 118b, . . . , 119b in the users 150b, . . . , 152b may comprise suitable logic, circuitry, and/or code that may be adapted to demodulate the signals received from the base station 102b, for example. The channel decoders 120b, 121b may comprise suitable logic, circuitry, and/or code that may be adapted to decode the demodulated signals from the demodulators 118b, . . . , 119b into received binary bit streams $b'_1, \ldots, b'_k$, for example.

The channel estimators 122b, . . . , 123b may comprise suitable logic, circuitry, and/or code that may be adapted to estimate channel state information for one or more receive channels. The channel quantizers 126b, . . . , 127b may comprise suitable logic, circuitry, and/or code that may be adapted to quantize channel state information estimated by the channel estimators 122b, . . . , 123b. The feedback controllers 124b, . . . , 125b may comprise suitable logic, circuitry, and/or code that may be adapted to generate channel state information output 138b, . . . , 140b for communication to the base station 102b via the feedback link 142b.

In operation, input signals $b_1, \ldots, b_k$ may be encoded by the channel encoders 104b, . . . , 106b. Based on the knowledge of the downlink channel state information 138b, . . . , 140b received from the users 150b, . . . , 152b via the feedback link 142b, the user scheduler 108b may select a determined group of users to transmit so as to optimize certain performance criterion, such as the sum throughput of the communication system 100b. The binary data of each selected user may be modulated by the modulators 110b, . . . , 112b and may be transformed into complex symbols $u_1, \ldots, u_M$. The power control block 114b may then allocate the total transmit power to different users according to their respective channel quality. The channel quality may be determined based on the downlink channel state information 138b, . . . , 140b received from the users 150b, . . . , 152b via the feedback link 142b. The linear precoder 116b may then process the user data symbols in such a way that each user 150b, . . . , 152b may receive its own signal and little or no interference from other users. After the signal is transmitted from the M base station TX antennas and after it arrives at each of the users 150b, . . . , 152b, it may be demodulated and decoded into received binary bit streams $b'_1, \ldots, b'_K$.

In a frequency division duplex (FDD) system, such as the communication system 100b, the base station 102b may obtain the downlink channel state information 138b, . . . , 140b through a finite-rate feedback link 142b from the users 150b, . . . , 152b. In one embodiment of the invention, each user may estimate its own channel and may quantize the channel according to the feedback rate constraint of the communication system 100b. In this regard, a selection algorithm may be utilized so that the feedback controller 124b, . . . , 125b at each user may determine a finite-rate channel state information to feed back on the request of the base station 102b so as to optimize the user group selection by the base station 102b. The selection algorithm which is described below with respect to FIGS. 2A and/or 2B, may significantly reduce the communication system complexity as well as the total amount of required feedback information, thereby effectively reducing the feedback rate.

Figure 2A:
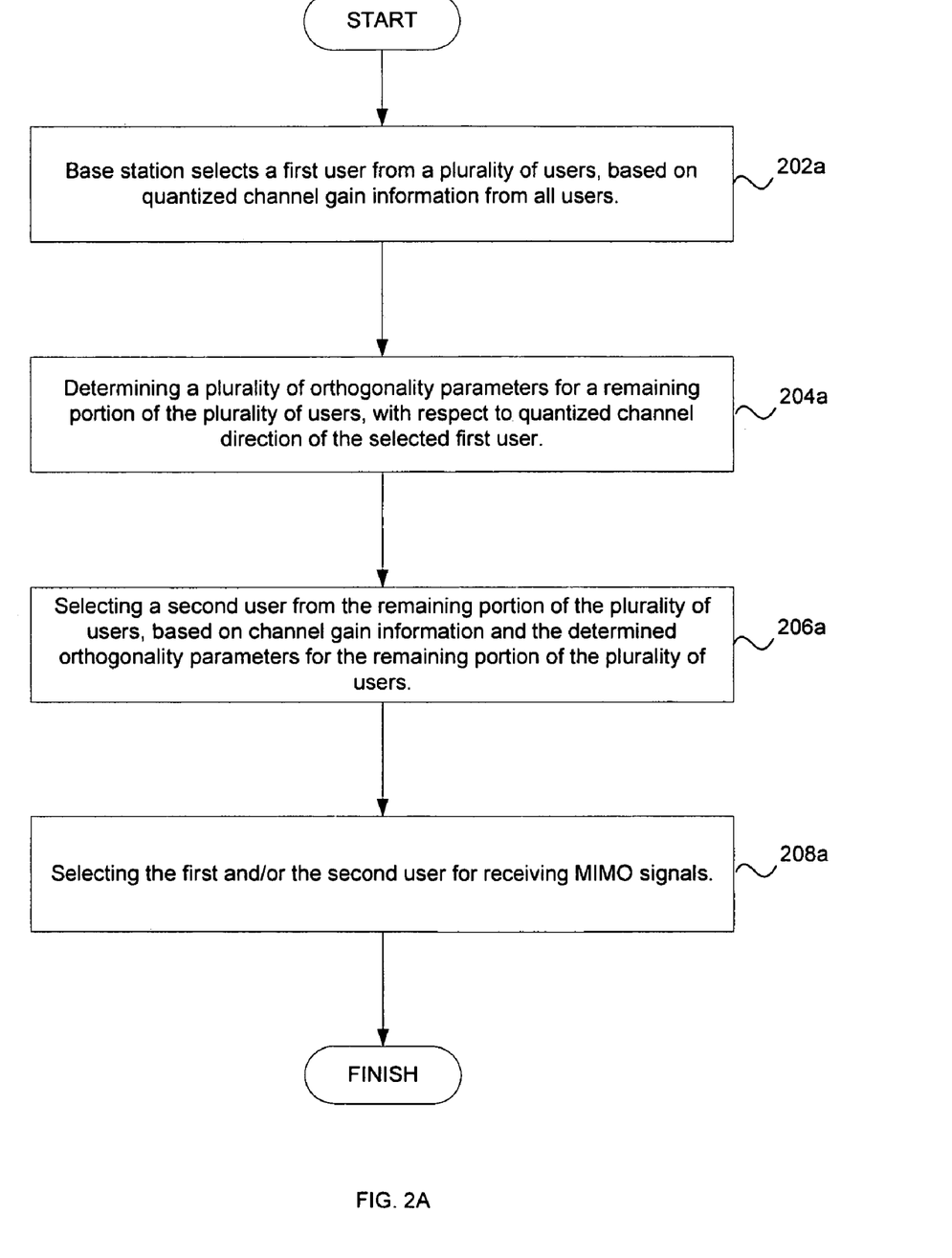
FIG. 2A is a high level flow diagram illustrating exemplary steps for improved user group selection with finite-rate channel state information feedback, in accordance with an embodiment of the invention.
Figure 2B:
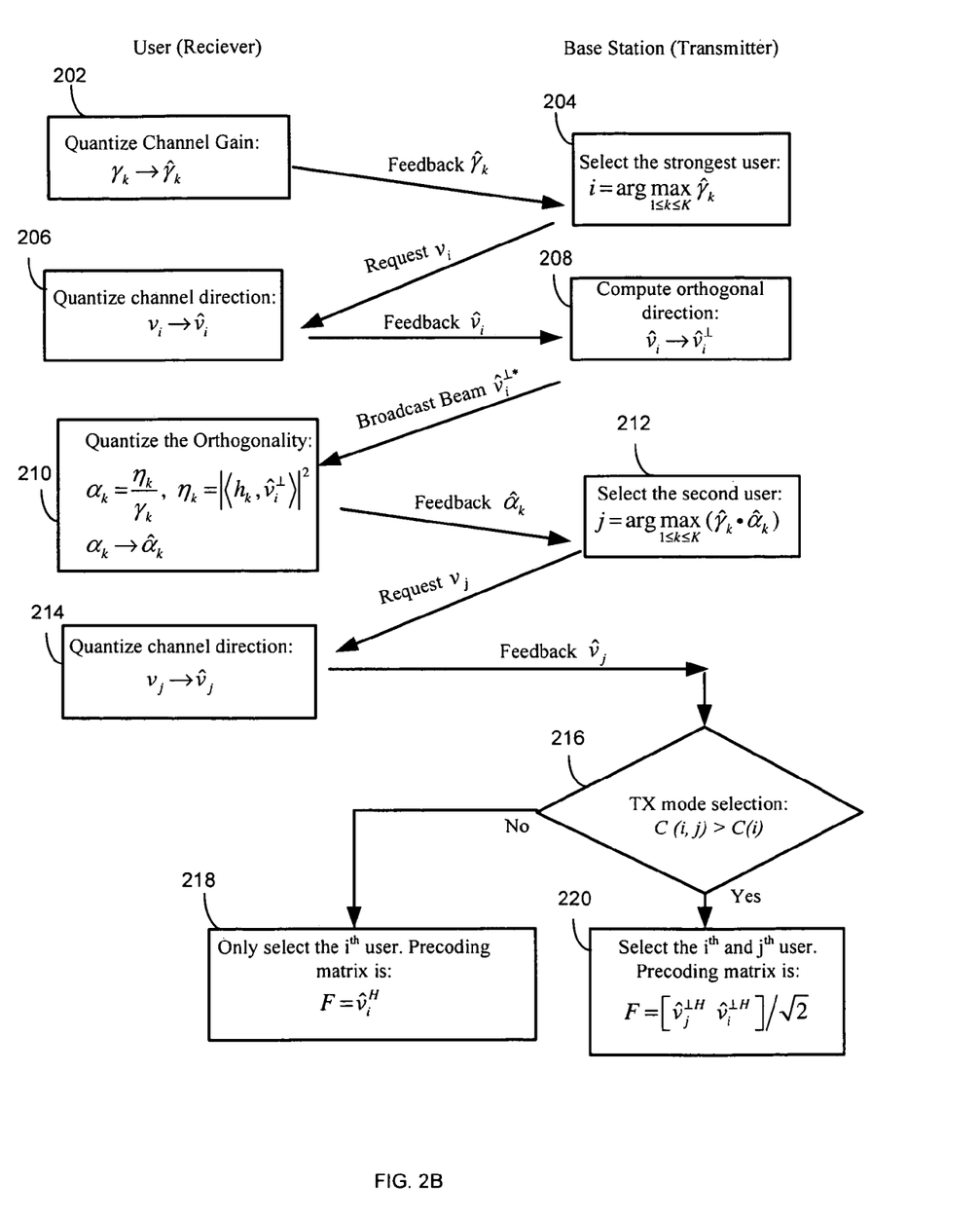
FIG. 2B is a flow diagram illustrating exemplary steps for improved user group selection with finite-rate channel state information feedback, in accordance with an embodiment of the invention.

FIG. 2A is a high level flow diagram illustrating exemplary steps for improved user group selection with finite-rate channel state information feedback, in accordance with an embodiment of the invention. Referring to FIGS. 1B and 2A, at 202a, the base station 102b may select a first user from a plurality of k users 150b, . . . , 152b, based on quantized channel gain information from all users. Each of the k users 150b, . . . , 152b may measure its channel power $\gamma_k = \|h_k\|^2$ and may supply the quantized channel power $\hat{\gamma}_i|_{i=1}^K$ to the base station 102b for selection of the first user. At 204a, after the first user is selected, a plurality of orthogonality parameters for a remaining portion of the plurality of users may be determined. The plurality of orthogonality parameters may be determined with respect to quantized channel direction of the selected first user. At 206a, a second user may be selected from the remaining portion of the plurality of users, based on channel gain information and the determined orthogonality parameters for the remaining portion of the plurality of users. At 208a, the first and/or the second user may be selected for receiving MIMO signals, based on a system capacity function. A precoding matrix may then be calculated by the base station 102b, based on whether the first and/or the second user is selected to receive signals within the communication system 100b.

FIG. 2B is a flow diagram illustrating exemplary steps for improved user group selection with finite-rate channel state information feedback, in accordance with an embodiment of the invention. Referring to FIGS. 1B and 2B, a simplified user group selection scheme may be utilized in a multiuser downlink channel with quantized CSI feedback within the communication system 100b. For simplicity, it may be assumed that M=2. Even though the algorithm is described with respect to M=2, the present invention may not be so limited and the algorithm described herein may be applicable to other FDD communication systems with a different number of transmit antennas. As demonstrated in FIG. 2B, the user group selection algorithm may be combined with a CSI feedback scheme and may comprise the following 10 steps.

It may be assumed that users have ideal CSIR in a sense that the MISO channel impulse response $h_k \in \mathbb{C}^{1 \times 2}$ (M=2) may be known at each user. At 202, each user may quantize its own channel gain, or channel power $\gamma_k = \|h_k\|^2$ by a finite-rate scalar quantizer with quantization resolution $B_g$ bits per channel update using the channel quantizers 126b, . . . , 127b. The quantized channel gain $\gamma_k$ or the equivalent quantization index may then be conveyed back to the base station 102b through a rate constraint feedback link 142b. The channel gain quantizers 126b, . . . , 127b may be optimized to match to the precoder 116b used at the transmitter 102b, such as zero-forcing precoder. One or more performance metric, such as capacity and bit error rate, as well channel statistical distributions may also be utilized in order to improve the system performance.

At 204, based upon the feedback information $$\hat{\gamma}_k|_{k=1}^K,$$

the transmitter 102b may select the user with the largest channel gain based on the following expression $$i = \arg\max_{1 \leq k \leq K} \hat{\gamma}_k. \tag{11}$$

Based on the selected index i, the base station may request a channel direction feedback from the $i^{th}$ user asking for the unit norm vector $v_i (v_i = h_i / \|h_i\|)$.

At 206, based on the request from the base station, the $i^{th}$ user may quantize its own channel direction by a vector quantizer with inner product quantization criterion. The direction vector $v_i$ may be quantized into $\hat{v}_i$ with quantization resolution $B_v$ bits per channel update. The quantized vector $\hat{v}_i$ or the quantization index may be fed back to the base station using the same feedback link 142b.

At 208, based on the feedback direction $\hat{v}_i$, the base station 102b may form an orthonormal beam $\hat{v}_i^\perp$, which may be given by the equation $$\hat{v}_i^\perp = [\hat{v}_{i,2}{}^*, -\hat{v}_{i,1}{}^*], \tag{12}$$

where $\hat{v}_{i,1}$ and $\hat{v}_{i,2}$ may be the first and second elements of vector $\hat{v}_i$. The base station 102b may then broadcasts the conjugate beam $\hat{v}_i^{\perp *}$ to all the users 150b, . . . , 152b.

At 210, each receiver may measure its own received signal-to-noise ratio (SNR) $\eta_k$ with respect to the broadcast beam that the base station 102b sends out, which may be given by the equation $$\eta_k = |\langle h_k, \hat{v}_i^\perp \rangle|^2. \tag{13}$$

The inner product between the $k^{th}$ user's channel directional vector $v^k$ and vector $\hat{v}_i^\perp$ may, therefore, be given by the equation $$\alpha_k = \frac{|\langle h_k, \hat{v}_i^\perp \rangle|^2}{\|h_k\|^2} = \frac{\eta_k}{\gamma_k}, \tag{14}$$

where $\alpha_k$ may be an orthogonal parameter of the $k^{th}$ user and may comprise a real number in the range [0, 1]. The value of $\alpha_k$ may be indicative of the orthogonality of the channel directions between user j and user k. For example, $\alpha_k=1$ may correspond to the case that $h_k$ and $\hat{v}_i$ may be ideally orthogonal to each other. Each user may quantize the parameter $\alpha_k$ by using a scalar quantization function with quantization resolution $B_\alpha$ bits. In accordance with an embodiment of the invention, $B_\alpha$ may equal 1. In such instance, the quantized orthogonality parameter $\hat{\alpha}_k$ may be communicated as a 1-bit flag to the base station 102b. Further determination of the second user may be achieved based on the 1-bit flag. Such simplified user group selection algorithm is further described in U.S. patent application Ser. No. 11/232,340 filed Sep. 21, 2005, which is incorporated herein by reference in its entirety.

At 212, the base station 102b may select the second user based on the orthogonality parameter feedback information $\hat{\alpha}_k$ received from the k users. The base station 102b may select the second user by selecting the user with the largest projected channel power in an orthogonal direction $\hat{v}_i^\perp$. The second user j may be selected utilizing the following expression:

$$j = \arg \max_{1 \leq k \leq K} (\hat{\gamma}_k \cdot \hat{\alpha}_k) \qquad (15)$$

In this regard, the base station 102b may select the strongest user j among a plurality of semi-orthogonal groups. The strongest second user j may be identified as $$\max_{i=1 \to k}(\hat{\gamma}_i \cdot \hat{\eta}_i).$$

Based on the selected second user j, the base station 102b may requests a channel direction feedback from the $j^{th}$ user. The $j^{th}$ user may then calculate a direction $v_j (v_j = h_j/\|h_j\|)$ as a norm vector.

At 214, the $j^{th}$ user may quantize its own channel direction, based on a request from the base station 102b. The $j^{th}$ user may quantize its own channel direction $v_j$ by a vector quantizer with inner product quantization criterion. In this regard, the direction vector $v_j$ may be quantized into $\hat{v}_j$ with quantization resolution $B_v$ bits per channel update. The quantized direction vector $\hat{v}_j$ of the $j^{th}$ user may be fed back to the base station 102b using the feedback link 142b.

In this regard, the base station 102b has obtained two candidate users, i and j, and may select between various transmission modes. In one transmission mode, transmission to only the $i^{th}$ user using full power may occur. In another transmission mode, transmission to both user i and user j may occur with power being equally allocated between both user i and user j. At 216, the system capacity for these transmission modes may be calculated utilizing the following expressions:

$$C(i) \approx \log_2(1 + \rho \cdot \hat{\gamma}_i) \qquad (16)$$

$$C(i,j) \approx \log_2\left(1 + \frac{1}{2}\rho \cdot \hat{\gamma}_i \cdot \hat{\alpha}_j\right) + \log_2\left(1 + \frac{1}{2}\rho \cdot \hat{\gamma}_j \cdot \hat{\alpha}_j\right) \qquad (17)$$

where $\rho$ may be the system average SNR. The approximations "≈" may result from the fact that both $\hat{\gamma}_i$ and $\hat{\gamma}_j$ are quantized, and the two users i and j may be assumed to be perfectly orthogonal. Based on the comparison between C(i,j) and C(j), transmission mode with higher system capacity may be selected by the base station 102b. In one embodiment of the invention, it may be assumed that the quantized channel direction $\hat{v}_j$ of the second user j is orthogonal to the quantized channel direction $\hat{v}_i$ of the first user i.

At 220, if C(i,j)>C(j), the transmission mode that utilizes spatial multiplexing may be utilized to communicate to both users i and j at the same time. The transmitter preceding matrix F may be formed by the following equation $$F = [\hat{v}_j^{\perp H} \hat{v}_i^\perp]/\sqrt{2}. \qquad (18)$$

At 218, if C(i, j)≦C(i), a transmission mode in which the base station only communicates to the $i^{th}$ user may be utilized. In this case, the preceding matrix may be selected according to the equation $$F = \hat{v}_i^H \qquad (19)$$

Referring to FIGS. 1B and 2B, steps 202, 206, 210, and 214 may be achieved at the receiver side utilizing any of the users 150b, . . . , 152b, and steps 204, 208, 212, 216, 218, and 220 may be achieved at the transmitter or base station 102b side. The approach described herein may be extended to other more sophisticated precoders that may offer better system performance such as the minimum mean square error (MMSE) precoder, the Tomlinson-Harashima preceding (THP) precoder, and/or the sphere encoding precoder, for example. When the number of users K is large enough, there may be a high probability that two users exist having close to orthogonal channel vectors. In this instance, the zero-forcing precoder may be close to an optimal precoder and most preceding techniques may have similar system performance.

A comparison in terms of both search complexity and feedback load between an optimal user group selection algorithm and the user group selection algorithm described herein may be shown in Table 1.

TABLE 1

|  | The Present Scheme | Optimal or Brute Force User Group Selection |
|---|---|---|
| Complexity | $\leq 2 K_a$ | $\geq \frac{K^2}{2} b$ |
| Feedback Amount | $K \cdot B_g + K \cdot B_\alpha + 2 \cdot B_v$ | $K \cdot B_g + K \cdot B_v$ |

Complexity And Feedback Comparison

Table 1 provides a comparison between the optimal user group selection algorithm and the user group selection algorithm described herein in terms of both search complexity and feedback load. The coefficient a may represent the complexity of comparing two values, and b may represent the complexity of computing water-filling solution. In this regard, b>>a. The selection algorithm described herein may only require two searches for the maximum value determination in step 202 and 212, respectively. The first search may be among K users, and the second search may be among the rest (K−1) users. If a represents the complexity of comparing two positive real numbers, then the complexity of the channel state information feedback scheme disclosed herein may be given by the following expression:

$$\chi \leq 2Ka, \qquad (20)$$

as shown in Table 1. As for the optimal group search algorithm, for each of the $$\binom{K}{1} + \binom{K}{2} = \frac{K(K+1)}{2}$$

possible groups, a water-filling solution may be calculated to obtain the sum rate for each group. If b represents the complexity of computing water-filling solution, the complexity of the optimal group selection algorithm may be represented by the expression:

$$\chi_{opt} \geq \frac{K^2}{2} b. \tag{21}$$

It may be noted that a<<b, and $$\chi << \chi_{opt}. \tag{22}$$

The total amount of feedback of the channel state information feedback scheme disclosed herein may be represented by the expression:

$$B = K \cdot B_g + K \cdot B_\alpha + 2 \cdot B_v \text{ bits}, \tag{23}$$

whereas that of the optimal group selection algorithm may be represented by the expression:

$$B_{opt} = K \cdot B_g + K \cdot B_v \text{ bits}. \tag{24}$$

Therefore the required amount feedback may be significantly reduced in the new scheme described herein, $$B << B_{opt}. \tag{25}$$

Figure 3:
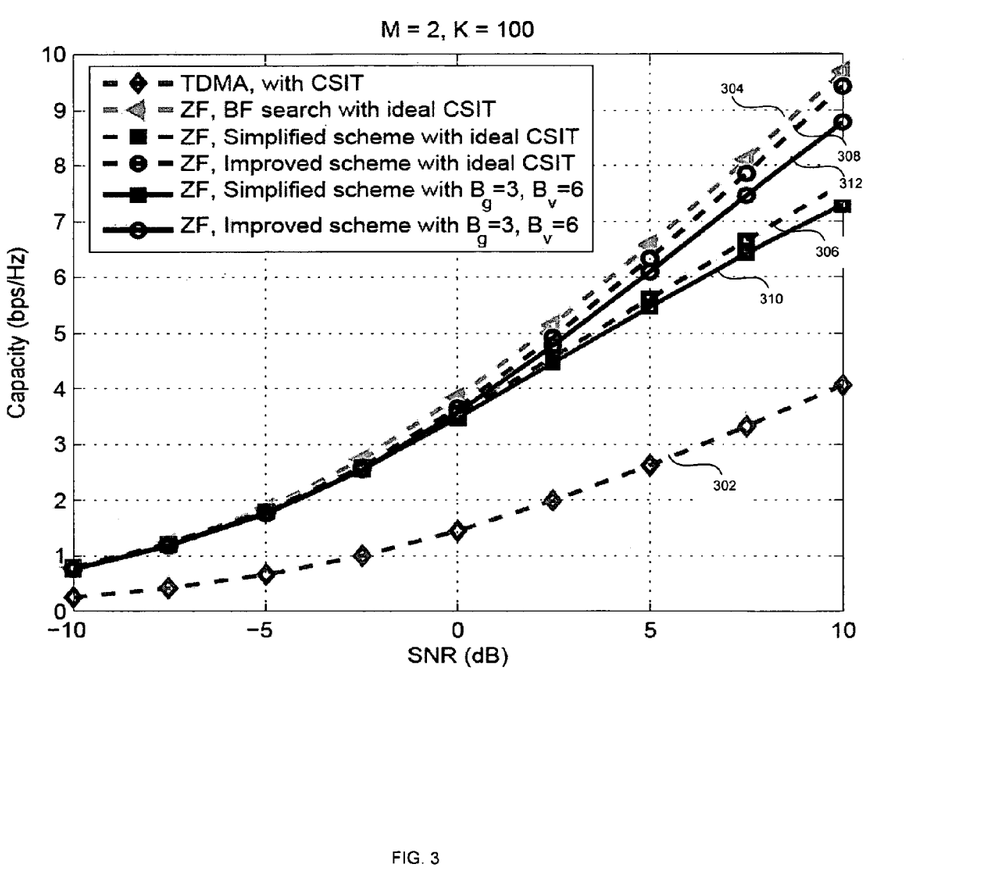
FIG. 3 is a graph that illustrates exemplary downlink transmission schemes in terms of sum rate, in accordance with an embodiment of the present invention.

FIG. 3 is a graph that illustrates exemplary downlink transmission schemes in terms of sum rate, in accordance with an embodiment of the present invention. Referring to FIG. 3, there are shown the results of a numerical simulation corresponding to the sum rate of a cellular system with a single base station and K=100 users. The base station may be equipped with M=2 antennas, for example, and each user may be equipped with a single antenna. The channels are flat fading Rayleigh channels. The transmit antennas at the base station may be spaced or located so as to experience independent fading. The modulation format applied in this instance may be quadrature phase-shift keying (QPSK), for example, and the orthogonality parameter $\alpha_k$, as in equation (15), may be quantized by a 1 bit quantizer, $B_\alpha=1$.

Referring to FIG. 3, four results are illustrated in the graph. The signal 302 may correspond to the rate sum of a TDMA scheme with channel state information at the transmitter (CSIT). The signal 304 may correspond to the rate sum of a zero-forcing (ZF), brute-force (BF) search with ideal CSIT. In accordance with an embodiment of the invention, the signal 306 may correspond to the rate sum of a ZF and simplified search scheme with ideal CSIT. The signal 308 may correspond to the rate sum of a ZF, improved search scheme with ideal CSIT. The signal 310 may correspond to the rate sum of a ZF, simplified search scheme with 3-bits allocated for channel gain feedback (Bg=3) and 6 bits allocated for channel directional feedback (Bv=6). The signal 312 may correspond to the rate sum of a ZF, improved search scheme with 3-bits allocated for channel gain feedback (Bg=3) and 6 bits allocated for channel directional feedback (Bv=6), and 1 bit allocated for orthogonality parameter $\alpha_k$ ($B_\alpha=1$).

The TDMA scheme illustrated by the signal 302 may pick a single user in a round robin fashion and may only transmit to one user at a time using maximum ratio transmission whereas zero-forcing precoding schemes, as described by the signals 304, 306, and 308, may communicate to multiple users at a time. Therefore, the zero-forcing preceding schemes may achieve a higher sum rate than TDMA schemes. The zero-forcing precoding with the optimal brute-force user group selection, the signal 304, may exhibit the best performance at the cost of high computational complexity and high feedback load. In accordance with an embodiment of the invention, the signal 306 significantly outperforms the TDMA scheme with only very limited extra CSI feedback. It may also be noted from FIG. 3 that allocating 3 bits for channel gain feedback, 6 bits for channel direction feedback, and 1 bit for orthogonality parameter feedback may be sufficient to approach the performance of ideal CSI at the transmitter (CSIT).

In one embodiment of the invention, 3 bits may be allocated for channel gain feedback, 1 bit may be allocated for the quantized orthogonality parameter $\hat{\alpha}_k$ feedback, and 6 bits may be allocated for the orthogonal channel direction feedback $\hat{v}_j$. In this regard, the average feedback rate may be approximately 4.06 bits per user per channel update. It may noted from the graph in FIG. 3 that the system performance of the improved user group selection scheme disclosed herein with approximately 4 bits feedback rate, may approach the performance of a communication system with an ideal CSI at the transmitter (CSIT). Furthermore, the improved user group selection scheme disclosed herein may significantly improve performance in terms of either sum rate or bit error rate (BER), while utilizing a limited CSI feedback. Such CSI feedback may be negligible when the number of users is large.

Figure 4:
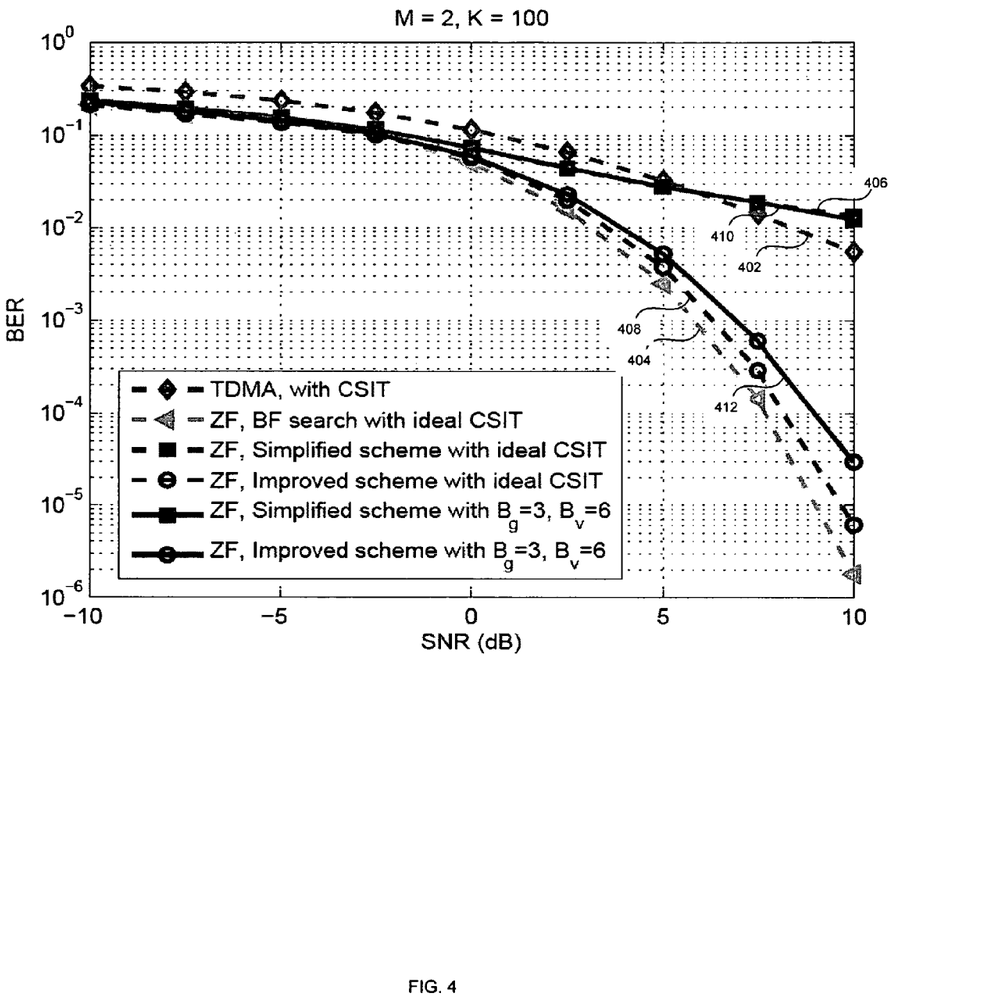
FIG. 4 is a graph that illustrates exemplary downlink transmission schemes in terms of bit error rate, in accordance with an embodiment of the present invention.

FIG. 4 is a graph that illustrates exemplary downlink transmission schemes in terms of bit error rate, in accordance with an embodiment of the present invention. Referring to FIG. 4, there are shown the results of a numerical simulation corresponding to the bit error rate (BER) of a cellular system with a single base station and K=100 users. The base station may be equipped with M=2 antennas, for example, and each user may be equipped with a single antenna. The channels may be flat fading Rayleigh channels. The transmit antennas at the base station may be spaced or separated so as to experience independent fading. The modulation format applied in this instance may be QPSK, for example.

In this instance, there are four results provided. The signal 402 may correspond to the BER of a TDMA scheme with CSIT. The signal 404 may correspond to the BER of a ZF, BF search with ideal GSIT. The signal 406 may correspond to the BER of a ZF, simplified search scheme with ideal CSIT. The signal 408 may correspond to the BER of a ZF, improved search scheme with ideal CSIT. The signal 410 may correspond to the BER of a ZF, simplified search scheme with $B_g=3$, $B_v=6$, and $B_\alpha=1$. The signal 412 may correspond to the BER of a ZF, improved search scheme with Bg=3 and Bv=6. The results for the BER performance between the signals 402, . . . , 412 are substantially the same as the results for the signals 302, 312 shown for the rate sum in FIG. 3.

In comparison to the brute-force user selection algorithm, the channel state information feedback scheme disclosed herein may significantly reduce the computational complexity. For example, the complexity may be reduced from about $K^2/2$ to less than 2K(K>>2), where K may represent the number of users. The various embodiments of the invention may also significantly reduce the total amount of feedback information from $(K \cdot B_g + K \cdot B_v)$ bits to $(K \cdot B_g + K \cdot B_\alpha + 2 \cdot B_v)$ bits with ($B_v > B_\alpha$). Therefore, the new scheme may only require very limited CSI feedback rate, in an order of a few bits per user, for example.

Although with a low bitrate constrained CSI feedback channel, the channel state information feedback scheme disclosed herein may achieve multiuser diversity as well as spacial multiplexing when there are a large amount of users. In accordance with an embodiment of the invention, this simplified user group selection scheme may significantly outperform the TDMA scheme and achieve performance in terms of capacity close to systems with ideal CSIT with minimal, about 3 bits per user, feedback rate. In one embodiment of the invention, the channel state information feedback scheme disclosed herein may be utilized with more sophisticated precoders, such as a minimum mean square error (MMSE) precoder, THP precoder, sphere encoding precoder, for example.

Another embodiment of the invention may provide a machine-readable storage, having stored thereon, a computer program having at least one code section executable by a machine, thereby causing the machine to perform the steps as described above for an improved user group selection scheme with finite-rate channel state information feedback for frequency division duplex (FDD) multiuser multiple-input-multiple-output (MIMO) downlink transmission.

Referring to FIG. 1B, in one embodiment of the invention, the base station 102*b* may select, from a plurality of users in a frequency division duplex (FDD) multiuser communication system, a first user having a channel gain that is greater than a feedback channel gain corresponding to a remaining portion of the users. The base station 102*b* may select a second user from the remaining portion of the plurality of users, based on a feedback channel gain of the second user and feedback orthogonality of the second user's channel direction with respect to that of the first user. The selected second user may have a channel gain that is greater than a feedback channel gain corresponding to the remaining portion of the plurality of users. The selected second user also has a channel direction that may be approximately orthogonal to that of the first user. The feedback channel gain may comprise feedback quantized channel gain. The base station 102*b* may determine a quantized channel direction of the selected first user for the selecting the at least the second user.

The orthogonality of the channel direction of the second user may be based on an effective received signal-to-noise ratio (SNR) of the second user with respect to the broadcasted beam vector $\hat{v}_i^\perp$ from the base station. The base station 102*b* may maximize a system capacity based on the selecting of the first user and the selecting of the second user. The base station 102*b* may generate a first preceding matrix for precoding at least one transmit signal within the communication system, if a system capacity function for the selected first user and the selected second user is greater than a system capacity function for the selected first user. The first precoding matrix may be determined from a quantized channel direction of the selected first user and a quantized channel direction of the second user. The base station 102*b* may generate a second preceding matrix for preceding at least one transmit signal within the communication system, if a system capacity function for the selected first user and the selected second user is not greater than a system capacity function for the selected first user. The second precoding matrix may be determined from a complex conjugate of a quantized channel direction of the selected first user.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
  selecting, from a plurality of signal receiving users in a frequency division duplex (FDD) multiuser communication system, a first user having a channel gain that is greater than a channel gain corresponding to a remaining portion of said plurality of users; and
  selecting a second user from said remaining portion of said plurality of signal receiving users, based on a feedback channel gain of said second user and feedback orthogonality of a channel direction of said second user with respect to a channel direction of said first user.

2. The method according to claim 1, wherein said selected second user has a channel gain that is greater than a feedback channel gain corresponding to said remaining portion of said plurality of users.

3. The method according to claim 1, wherein said channel direction of said selected second user is approximately orthogonal to said channel direction said first user.

4. The method according to claim 1, wherein said feedback channel gain comprises feedback quantized channel gain.

5. The method according to claim 1, comprising determining a quantized channel direction of said selected first user for said selecting said at least said second user.

6. The method according to claim 1, wherein said orthogonality of said channel direction of said second user is based on an effective received signal-to-noise ratio (SNR) of said second user with respect to a beam vector broadcasted within the communication system.

7. The method according to claim 1, comprising maximizing a system capacity based on said selecting said first user and said selecting said second user.

8. The method according to claim 1, comprising, if a system capacity function for said selected first user and said selected second user is greater than a system capacity function for said selected first user, generating a first precoding matrix for precoding at least one transmit signal within the communication system.

9. The method according to claim 8, wherein said first precoding matrix is determined from a quantized channel direction of said selected first user and a quantized channel direction of said selected second user.

10. The method according to claim 1, comprising, if a system capacity function for said selected first user and said selected second user is not greater than a system capacity function for said selected first user, generating a second precoding matrix for precoding at least one transmit signal within the communication system, wherein said second precoding matrix is determined from a complex conjugate of a quantized channel direction of said selected first user.

11. A system for processing signals in a communication system, the system comprising:
   circuitry that selects, from a plurality of signal receiving users in a frequency division duplex (FDD) multiuser communication system, a first user having a channel gain that is greater than a channel gain corresponding to a remaining portion of said plurality of users; and
   said circuitry selects a second user from said remaining portion of said plurality of signal receiving users, based on a feedback channel gain of said second user and feedback orthogonality of a channel direction of said second user with respect to a channel direction of said first user.

12. The system according to claim 11, wherein said selected second user has a channel gain that is greater than a feedback channel gain corresponding to said remaining portion of said plurality of users.

13. The system according to claim 11, wherein said channel direction of said selected second user is approximately orthogonal to said channel direction of said first user.

14. The system according to claim 11, wherein said feedback channel gain comprises feedback quantized channel gain.

15. The system according to claim 11, wherein said circuitry determines a quantized channel direction of said selected first user for said selecting said at least said second user.

16. The system according to claim 11, wherein said orthogonality of said channel direction of said second user is based on an effective received signal-to-noise ratio (SNR) of said second user with respect to a beam vector broadcasted within the communication system.

17. The system according to claim 11, wherein said circuitry maximizes a system capacity based on said selecting said first user and said selecting said second user.

18. The system according to claim 11, wherein said circuitry generates a first precoding matrix for precoding at least one transmit signal within the communication system, if a system capacity function for said selected first user and said selected second user is greater than a system capacity function for said selected first user.

19. The system according to claim 18, wherein said first precoding matrix is determined from a quantized channel direction of said selected first user and a quantized channel direction of said selected second user.

20. The system according to claim 11, wherein said circuitry generates a second precoding matrix for precoding at least one transmit signal within the communication system, if a system capacity function for said selected first user and said selected second user is not greater than a system capacity function for said selected first user, wherein said second precoding matrix is determined from a complex conjugate of a quantized channel direction of said selected first user.

21. A machine-readable storage having stored thereon, a computer program having at least one code section for processing signals in a communication system, the at least one code section being executable by a machine for causing the machine to perform steps comprising:
   selecting, from a plurality of signal receiving users in a frequency division duplex (FDD) multiuser communication system, a first signal having a channel gain that is greater than a channel gain corresponding to a remaining portion of said plurality of users; and
   selecting a second user from said remaining portion of said plurality of signal receiving users, based on a feedback channel gain of said second user and feedback orthogonality of a channel direction of said second user with respect to a a channel direction of said first user.

22. The machine-readable storage according to claim 21, wherein said selected second user has a channel gain that is greater than a feedback channel gain corresponding to said remaining portion of said plurality of users.

23. The machine-readable storage according to claim 21, wherein said channel direction of said selected second user is approximately orthogonal to said channel direction of said first user.

24. The machine-readable storage according to claim 21, wherein said channel gain is defined by a quantized channel gain.

25. The machine-readable storage according to claim 21, comprising code for determining a quantized channel direction of said selected first user for said selecting said at least said second user.

26. The machine-readable storage according to claim 21, wherein said orthogonality of said channel direction of said second user is based on an effective received signal-to-noise ratio (SNR) of said second user with respect to a beam vector broadcasted within the communication system.

27. The machine-readable storage according to claim 21, comprising code for maximizing a system capacity based on said selecting said first user and said selecting said second user.

28. The machine-readable storage according to claim 21, comprising code for generating a first precoding matrix for precoding at least one transmit signal within the communication system, if a system capacity function for said selected first user and said selected second user is greater than a system capacity function for said selected first user.

29. The machine-readable storage according to claim 28, wherein said first precoding matrix is determined from a quantized channel direction of said selected first user and a quantized channel direction of said selected second user.

30. The machine-readable storage according to claim 21, comprising code for generating a second precoding matrix for precoding at least one transmit signal within the communication system, if a system capacity function for said selected first user and said selected second user is not greater than a system capacity function for said selected first user, wherein said second precoding matrix is determined from a complex conjugate of a quantized channel direction of said selected first user.

* * * * *

UNITED STATES PATENT AND TRADEMARK OFFICE
CERTIFICATE OF CORRECTION

PATENT NO.        : 7,630,337 B2                                            Page 1 of 1
APPLICATION NO.   : 11/232266
DATED             : December 8, 2009
INVENTOR(S)       : Zheng et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this

Second Day of November, 2010

David J. Kappos
*Director of the United States Patent and Trademark Office*